US007994841B2

United States Patent
Chen et al.

(10) Patent No.: US 7,994,841 B2
(45) Date of Patent: Aug. 9, 2011

(54) DUAL TEMPERATURE CONTROL CIRCUIT

(75) Inventors: Fei Chen, Shanghai (CN); Wu-Kui Li, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/767,689

(22) Filed: Apr. 26, 2010

(65) Prior Publication Data

US 2010/0295603 A1    Nov. 25, 2010

(30) Foreign Application Priority Data

May 21, 2009    (CN) .......................... 2009 2 0303439

(51) Int. Cl.
*G05F 1/10* (2006.01)
(52) U.S. Cl. ...................................... 327/512; 327/513
(58) Field of Classification Search .................. 327/512, 327/513; 324/750.03, 750.06
See application file for complete search history.

(56) References Cited

U.S. PATENT DOCUMENTS

| | | | |
|---|---|---|---|
| 3,838,248 A * | 9/1974 | Uchida et al. ................. | 219/210 |
| 5,896,025 A * | 4/1999 | Yamaguchi et al. .......... | 320/134 |
| 5,990,720 A * | 11/1999 | Tokioka et al. ............... | 327/253 |
| 6,255,892 B1 * | 7/2001 | Gartner et al. ................ | 327/512 |
| 6,334,093 B1 * | 12/2001 | More .............................. | 702/99 |
| 6,359,498 B1 * | 3/2002 | Kurihara et al. .............. | 327/513 |
| 6,441,674 B1 * | 8/2002 | Lin .............................. | 327/512 |
| 6,882,213 B2 * | 4/2005 | Kim .............................. | 327/512 |
| 6,889,544 B2 * | 5/2005 | Tanimoto et al. ........... | 73/204.15 |
| 7,046,055 B2 * | 5/2006 | Lee et al. ....................... | 327/143 |
| 7,671,661 B2 * | 3/2010 | Jung et al. ..................... | 327/512 |
| 2006/0245136 A1 | 11/2006 | Chang et al. | |
| 2009/0257164 A1 * | 10/2009 | Ikeuchi et al. ............... | 361/91.5 |
| 2011/0001546 A1 * | 1/2011 | Guo et al. ..................... | 327/512 |

* cited by examiner

*Primary Examiner* — Thomas J Hiltunen
(74) *Attorney, Agent, or Firm* — Raymond J. Chew

(57) ABSTRACT

A dual temperature control circuit detects a first temperature of a first location and a second temperature of a second location. The dual temperature control circuit transforms the first temperature to a first voltage signal, and transforms the second temperature to a second voltage signal, and compares the first voltage signal and the second voltage signal to output a third voltage signal, where a controlled circuit is controlled according to the third voltage signal.

6 Claims, 1 Drawing Sheet

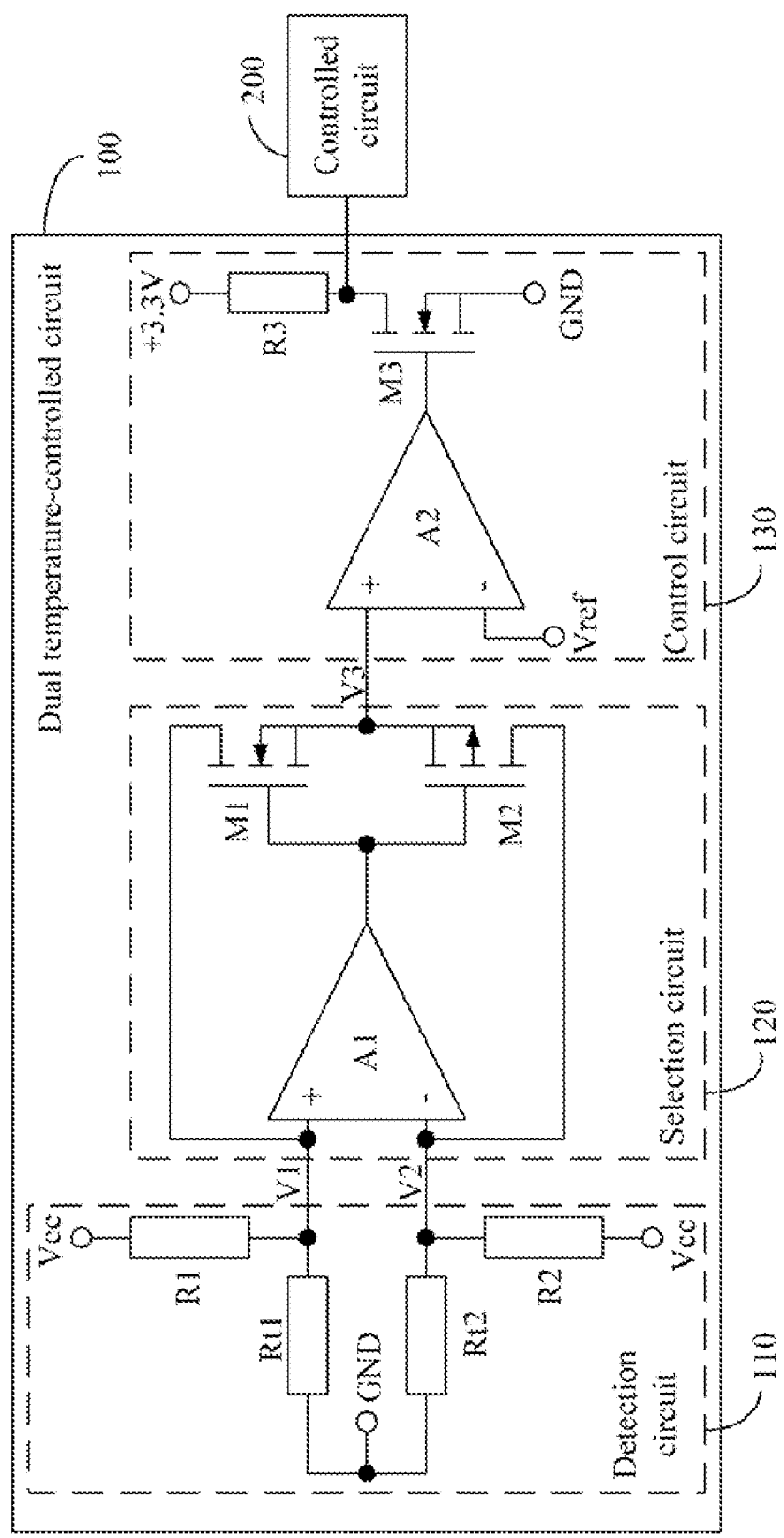

DUAL TEMPERATURE CONTROL CIRCUIT

BACKGROUND

1. Technical Field

Embodiments of the present disclosure relate to temperature control circuits, and more particularly to a dual temperature control circuit.

2. Description of Related Art

Presently, a temperature control circuit often utilizes a temperature control integrated circuit (IC) to detect a temperature of a predetermined area of a component of an electronic device such as a home gateway, and sends a control signal to a controlled circuit when the detected temperature reaches a predefined temperature.

However, the temperature control circuit is not versatile and therefore not suitable for many purposes because one temperature control IC can only detect the temperature at the one area of the electronic device.

BRIEF DESCRIPTION OF THE DRAWINGS

The details of the disclosure, both as to its structure and operation, can best be understood by referring to the accompanying drawing, in which like reference numbers and designations refer to like elements.

The FIGURE is a circuit diagram of one embodiment of a dual temperature control circuit in accordance with the present disclosure.

DETAILED DESCRIPTION

The FIGURE is a circuit diagram of one embodiment of a dual temperature control circuit 100 in accordance with the present disclosure. In one embodiment, the dual temperature control circuit 100 detects temperatures of two predetermined areas of electronic components (herein, referred to as "locations") of an electronic device such as a home gateway, and controls a controlled circuit 200 according to the temperatures of the two locations. The controlled circuit 200 may be a power control integrated circuit (IC), which works normally according to a predefined voltage signal, or stops working according to a voltage signal less than the predefined voltage signal. In one example, the predefined voltage signal is +3.3V direct current (DC) voltage. In a non-limiting example, the electronic components may comprise integrated circuits, resistors, capacitors, and inductors.

In one embodiment, the dual temperate-controlled circuit 100 includes a detection circuit 110, a selection circuit 120, and a control circuit 130.

The detection circuit 110 is operable to detect a first temperature of a first location and a second temperature of a second location of the electronic device, transform the first temperature to a first voltage signal V1, and transform the second temperature to a second voltage signal V2. In one embodiment, the detection circuit 110 includes a first voltage dividing resistor R1, a first temperature sensitive resistor Rt1, a second voltage dividing resistor R2, and a second temperature sensitive resistor Rt2.

In one example, the first temperature sensitive resistor Rt1 may have a positive temperature coefficient. In such an example, when the first temperature sensitive resistor Rt1 is affected by the first temperature of the first location, a resistance value of the first temperature sensitive resistor Rt1 increases along with an increase of the first temperature of the first location.

In one example, the second temperature sensitive resistor Rt2 may have a positive temperature coefficient. In such an example, when the second temperature sensitive resistor Rt2 is affected by the second temperature of the second location, a resistance value of the second temperature sensitive resistor Rt2 increases along with an increase of the second temperature of the second location.

In other embodiments, the first temperature sensitive resistor Rt1 and the second temperature sensitive resistor Rt2 may have negative temperature coefficients, whose resistance values decrease when the temperature increases.

The first temperature sensitive resistor Rt1 is operable to detect the first temperature of the first location. The first voltage dividing resistor R1 and the first temperature sensitive resistor Rt1 are connected in series between a reference voltage source Vcc and ground, to divide the reference voltage source Vcc to transform the first temperature to the first voltage signal V1. In one embodiment, when the first temperature of the first location changes, the resistance value of the first temperature sensitive resistor Rt1 also changes. Accordingly, the first voltage signal V1 divided from the reference voltage source Vcc also changes. In detail, the first voltage signal V1 is equal to Vcc*Rt1/(Rt1+R1), and thus is positively correlated with the resistance value of the first temperature sensitive resistor Rt1.

The second temperature sensitive resistor Rt2 is operable to detect the second temperature of the second location. The second voltage dividing resistor R2 and the second temperature sensitive resistor Rt2 are connected in series between the reference voltage source Vcc and ground, to divide the reference voltage source Vcc to transform the second temperature to the second voltage signal V2. In one embodiment, when the second temperature of the second location changes, the resistance value of the second temperature sensitive resistor Rt2 also changes. Accordingly, the second voltage signal V2 divided from the reference voltage source Vcc also changes. In detail, the second voltage signal V2 is equal to Vcc*Rt2/(Rt2+R2), and thus is positively correlated with the resistance value of the second temperature sensitive resistor Rt2.

The selection circuit 120 is operable to compare the first voltage signal V1 and the second voltage signal V2 to output a third voltage signal V3 according to the comparison. In one embodiment, the selection circuit 120 includes a first comparator A1, a first N-type field effect transistor (N-FET) M1, and a P-type field effect transistor (P-FET) M2.

A non-inverting input of the first comparator A1 is connected to a common node of the first voltage dividing resistor R1 and the first temperature sensitive resistor Rt1, and operable to receive the first voltage signal V1 from the detection circuit 110. An inverting input of the first comparator A1 is connected to a common node of the second voltage dividing resistor R2 and the second temperature sensitive resistor Rt2, and operable to receive the second voltage signal V2 from the detection circuit 110. The first comparator A1 is operable to compare the first voltage signal V1 and the second voltage signal V2 to output a first high voltage level signal when the first voltage signal V1 is greater than the second voltage signal V2, or output a first low voltage level signal when the first voltage signal V1 is less than the second voltage signal V2.

A gate of the first NEFT M1 is connected to an output of the first comparator A1, operable to receive the first high voltage level signal or the low voltage level signal from the output of the first comparator A1. A drain of the first N-FET M1 is connected to the common node of the first voltage dividing resistor R1 and the first temperature sensitive resistor Rt1, and operable to receive the first voltage signal V1 from the detection circuit 110. The first N-FET M1 turns on according to the first high voltage level signal from the output of the first comparator A1 to output the first voltage signal V1 to the control circuit 130 via a source of the first N-FET M1, or cuts off according to the first low voltage level signal from the output of the first comparator A1.

A gate of the P-FET M2 is connected to the output of the first comparator A1, and operable to receive the first high voltage level signal or the low voltage level signal from the output of the first comparator A1. In one example, the first high voltage level signal is a +3.3V voltage signal, and the first low voltage signal is a 0V voltage signal. A drain of the P-FET M2 is connected to the common node of the second voltage resistor R2 and the second temperature sensitive resistor Rt2, and operable to receive the second voltage signal V2 from the detection circuit 110. A source of the P-FET M2 is connected to the source of the first N-FET M1. The P-FET M2 cuts off according to the first high voltage level signal from the output of the first comparator A1, or turns on according to the first low voltage level signal from the output of the first comparator A1 to output the second voltage V2 to the control circuit 130 via the source of the P-FET M2.

It should be understood that the first comparator A1 outputs the first high voltage level signal when the first voltage signal V1 is greater than the second voltage V2. In such a case, the common node of the sources of the first N-FET M1 and P-FET M2 outputs the first voltage signal V1 to the control circuit 130. In other words, the third voltage signal V3 output from the selection circuit 120 is substantially equal to the first voltage signal V1.

Conversely, the first comparator A1 outputs the first low voltage level signal when the first voltage signal V1 is less than the second voltage V2. In such a case, the common node of the sources of the first N-FET M1 and P-FET M2 outputs the second voltage signal V2 to the control circuit 130. In other words, the third voltage signal V3 output from the selection circuit 120 is substantially equal to the second voltage signal V2.

The control circuit 130 is connected to the selection circuit 120, and operable to control the controlled circuit 200 according to the third voltage signal V3 output from the selection circuit 120. In one embodiment, the control circuit 130 includes a second comparator A2, a second N-FET M3, and a control resistor R3.

A non-inverting input of the second comparator A2 is connected to the source of the first N-FET M1 and the source of the P-FET M2, and operable to receive the third voltage signal V3 from the selection circuit 120. An inverting input of the second comparator A2 is connected to a reference voltage signal Vref. The second comparator A2 compares the third voltage signal V3 and the reference voltage signal Vref to output a second high voltage level signal when the third voltage signal V3 is greater than the reference voltage signal Vref, or output a second low voltage level signal when the third voltage signal V3 is less than the reference voltage signal Vref. In one example, the second high voltage level signal is a +3.3V voltage signal, and the second low voltage signal is a 0V voltage signal.

A gate of the second N-FET M3 is connected to an output of the second comparator A2, and operable to receive the second high voltage level signal or the second low voltage level signal from the output of the second comparator A2. A drain of the second N-FET M3 is connected to the controlled circuit 200, and a source of the second N-FET M3 is grounded. The second N-FET M3 turns on according to the second high voltage level signal from the output of the second comparator A2, or cuts off according to the second low voltage level signal from the output of the second comparator A2.

The control resistor R3 is connected between a voltage source and the drain of the second N-FET M3. In one embodiment, the voltage of the voltage source is +3.3V DC voltage.

In one example, when the second N-FET M3 turns on, a voltage signal less than the voltage of the voltage source is output from a common node of the second N-FET M3 and the control resistor R3 to the controlled circuit 200. Accordingly, the controlled circuit 200 stops working.

In another example, when the second N-FET M3 cuts off, the voltage of the voltage source is output to the controlled circuit 200 via the control resistor R3. Accordingly, the controlled circuit 200 works normally.

Thus, the dual temperature control circuit 100 detects temperatures of two locations, and reliably controls the controlled circuit 200 according to the temperatures of the two locations.

Additionally, the dual temperature control circuit 100 can be utilized to detect temperatures of more than two locations, and controls the controlled circuit 200 according to the temperatures of the more than two locations. In detail, the number of the detection circuit 110 and the selection circuit 120 can be increased to output more than two voltage signals to the control circuit 130, and thereby the control circuit 130 outputs different control signals to the controlled circuit 200.

While various embodiments of the present disclosure have been described above, it should be understood that they have been presented using example only and not using limitation. Thus the breadth and scope of the present disclosure should not be limited by the above-described embodiments, but should be defined only in accordance with the following claims and their equivalents.

What is claimed is:

1. A dual temperature control circuit, comprising:
   a detection circuit operable to detect a first temperature of a first location and a second temperature of a second location, transform the first temperature to a first voltage signal, and transform the second temperature to a second voltage signal;
   a selection circuit operable to compare the first voltage signal and the second voltage signal to output a third voltage signal according to the comparison, the selection circuit comprising:
   a first comparator with a non-inverting input operable to receive the first voltage signal from the detection circuit and an inverting input operable to receive the second voltage signal from the detection circuit, wherein the first comparator compares the first voltage signal and the second voltage signal to output a first high voltage level signal when the first voltage signal is greater than the second voltage signal, or output a first low voltage level signal when the first voltage signal is less than the second voltage signal;
   a first N-type field effect transistor (N-FET) with a gate connected to an output of the first comparator and a drain operable to receive the first voltage signal from the detection circuit, wherein the first N-FET turns on according to the first high voltage level signal from the output of the first comparator so as to output the first voltage signal via a source of the first N-FET, or cuts off according to the first low voltage level signal from the output of the first comparator; and
   a P-type field effect transistor (P-FET) with a gate connected to the output of the first comparator, a drain operable to receive the second voltage signal from the detection circuit, and a source connected to the source of the first N-FET, wherein the P-FET cuts off according to the first high voltage level signal from the output of the first comparator, or turns on according to the first low voltage level signal from the output of the first comparator so as to output the second voltage signal via the source of the P-FET; and a control circuit connected to the selection circuit, operable to control a controlled circuit according to the third voltage signal output from the selection circuit.

2. The dual temperature control circuit as claimed in claim 1, wherein the detection circuit comprises:
   a first voltage dividing resistor;
   a first temperature sensitive resistor operable to detect the first temperature of the first location, wherein the first voltage dividing resistor and the first temperature sensitive resistor are connected in series between a reference voltage source and a ground, so as to divide the reference voltage source to transform the first temperature to the first voltage signal;
   a second voltage dividing resistor; and
   a second temperature sensitive resistor operable to detect the second temperature of the second location, wherein the second voltage dividing resistor and the second temperature sensitive resistor are connected in series between the reference voltage source and the ground, so as to divide the reference voltage source to transform the second temperature to the second voltage signal.

3. The dual temperature control circuit as claimed in claim 2, wherein the non-inverting input of the first comparator is connected to a common node of the first voltage dividing resistor and the first temperature sensitive resistor, and the inverting input of the first comparator is connected to a common node of the second voltage dividing resistor and the second temperature sensitive resistor.

4. The dual temperature control circuit as claimed in claim 3, wherein the drain of the first N-FET is connected to the common node of the first voltage dividing resistor and the first temperature sensitive resistor, and the drain of the P-FET is connected to the common node of the second voltage dividing resistor and the second temperature sensitive resistor.

5. The dual temperature control circuit as claimed in claim 1, wherein the control circuit comprises:
   a second comparator with a non-inverting input connected to the source of the first N-FET and the source of the P-FET and operable to receive the third voltage signal from the selection circuit, and an inverting input connected to a reference voltage signal, wherein the second comparator compares the third voltage signal and the reference voltage signal to output a second high voltage level signal when the third voltage signal is greater than the reference voltage signal, or output a second low voltage level signal when the third voltage signal is less than the reference voltage signal;
   a second N-FET with a gate connected to an output of the second comparator, a drain connected to the controlled circuit, and a source grounded, wherein the second N-FET turns on according to the second high voltage level signal from the output of the second comparator, or cuts off according to the second low voltage level signal from the output of the second comparator; and
   a control resistor connected between a voltage source and the drain of the second N-FET;
   wherein a voltage signal less than a voltage of the voltage source is output from a common node of the second N-FET and the control resistor to the controlled circuit when the second N-FET turns on, and the voltage of the voltage source is output to the controlled circuit via the control resistor when the second N-FET cuts off.

6. The dual temperature control circuit as claimed in claim 5, wherein the voltage signal less than the voltage of the voltage source stops the controlled circuit working, and the voltage of the voltage source drives the controlled circuit to work normally.

* * * * *